US008727882B2

(12) United States Patent
Lum et al.

(10) Patent No.: US 8,727,882 B2
(45) Date of Patent: May 20, 2014

(54) GAME CONTROLLER THAT CONVERTS BETWEEN WIRELESS OPERATION AND WIRED OPERATION

(75) Inventors: Richard Lum, Redmond, WA (US); Wei Guo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 12/748,071

(22) Filed: Mar. 26, 2010

(65) Prior Publication Data

US 2010/0178984 A1 Jul. 15, 2010

Related U.S. Application Data

(63) Continuation of application No. 10/769,431, filed on Jan. 30, 2004, now Pat. No. 7,753,788.

(51) Int. Cl.
*A63F 13/02* (2006.01)
*H04J 1/16* (2006.01)
*H04W 84/22* (2009.01)

(52) U.S. Cl.
USPC ............. 463/39; 463/29; 455/557; 370/252

(58) Field of Classification Search
USPC ......... 463/29, 39, 37; 370/252, 254; 455/557, 455/127.5, 73; 345/169; 340/12.3; 341/22; 324/72.5
See application file for complete search history.

(56) References Cited

U.S. PATENT DOCUMENTS

| 5,440,227 | A | * | 8/1995 | Rogers ......................... 324/72.5 |
| 5,983,073 | A | | 11/1999 | Ditzik |
| 6,011,489 | A | * | 1/2000 | Ki Kwan et al. ............. 340/12.3 |
| 6,078,789 | A | | 6/2000 | Bodenmann et al. |
| 6,084,638 | A | | 7/2000 | Hare et al. |
| 6,151,645 | A | | 11/2000 | Young et al. |
| 6,169,789 | B1 | | 1/2001 | Rao et al. |
| 6,195,712 | B1 | | 2/2001 | Pawlowski et al. |
| 6,211,862 | B1 | | 4/2001 | Park et al. |
| 6,304,250 | B1 | | 10/2001 | Yang et al. |
| 6,317,061 | B1 | * | 11/2001 | Batra et al. ...................... 341/22 |
| 6,404,393 | B1 | | 6/2002 | Nelson et al. |
| 6,480,587 | B1 | | 11/2002 | Rao et al. |

(Continued)

FOREIGN PATENT DOCUMENTS

| JP | 7005689 | 1/1995 |
| JP | 07-212856 | 8/1995 |

(Continued)

OTHER PUBLICATIONS

Translated the Japanese Office Action mailed Feb. 1, 2011 for Japanese Patent Application No. 2005-21783, a counterpart foreign application of U.S. patent application No. 7,753,788.

(Continued)

*Primary Examiner* — Masud Ahmed
*Assistant Examiner* — Frank M Leiva
(74) *Attorney, Agent, or Firm* — Judy Yee; Micky Minhas; Lee & Hayes PLLC

(57) ABSTRACT

A game controller operates in both a wired mode and a wireless mode, and is able to switch between these two modes without permanent disruption to an ongoing game. The game controller is configured to detect a condition that suggests switching from the wireless mode of operation to a wired mode of operation, convey the indication to a host game system, and transition from the wireless mode of operation to the wired mode of operation.

20 Claims, 5 Drawing Sheets

(56) References Cited

U.S. PATENT DOCUMENTS

| | | | |
|---|---|---|---|
| 6,511,378 B1 | 1/2003 | Bhatt et al. | |
| 6,585,596 B1 | 7/2003 | Leifer et al. | |
| 6,684,062 B1 * | 1/2004 | Gosior et al. | 455/73 |
| 6,719,633 B1 * | 4/2004 | Leifer et al. | 463/39 |
| 6,752,719 B2 * | 6/2004 | Himoto et al. | 463/37 |
| 7,333,785 B1 * | 2/2008 | Lavelle et al. | 455/127.5 |
| 7,876,704 B1 * | 1/2011 | Bims et al. | 370/254 |
| 2003/0142631 A1 * | 7/2003 | Silvester | 370/252 |
| 2004/0122649 A1 | 6/2004 | Bartek et al. | |
| 2005/0096086 A1 | 5/2005 | Singamsetty | |

FOREIGN PATENT DOCUMENTS

| | | |
|---|---|---|
| JP | 9181804 | 7/1997 |
| JP | 2000-061136 | 2/2000 |
| JP | 2001162061(A) | 6/2001 |
| JP | 2002202843(A) | 7/2002 |
| JP | 2002209282(A) | 7/2002 |
| JP | 2002223266(A) | 8/2002 |
| JP | 2003179673 | 6/2003 |
| TW | 432307 | 5/2001 |
| WO | WO2005043333 | 5/2005 |
| WO | WO2005043333 A2 | 5/2005 |

OTHER PUBLICATIONS

The Canadian Office Action mailed May 29, 2012 for Canadian patent application No. 2494438, a counterpart foreign application of U.S. patent No. 7,753,788, 3 pages.

* cited by examiner ately reassociates the game data and user information with the game controller as it begins operating in the new mode. This allows the player to continue game play without interruption.

GAME CONTROLLER THAT CONVERTS BETWEEN WIRELESS OPERATION AND WIRED OPERATION

RELATED APPLICATIONS

This U.S. Non-provisional Application for Letters Patent is a continuation of and claims the benefit of priority to U.S. patent application Ser. No. 10/769,431, filed on Jan. 30, 2004, the disclosure of which is incorporated by reference herein.

TECHNICAL FIELD

This invention relates to peripherals for controlling video games, and more particularly, to game controllers that can be used for both wired and wireless play.

BACKGROUND

Game controllers facilitate user interaction with video games. Game controllers come in many configurations depending upon the desired gaming environment for which the controllers are to be used. There are multi-purpose controllers with one or more multi-function actuators for controlling a wide range of games and specialty controllers designed for specific genre of games, such as steering wheels for racing games, weapons for shooting games, and navigation sticks for aviation games.

Game controllers are designed to connect with the game hosting system using either wireless or wired technologies. For example, wired controllers for PC-based games typically connect to the PC via a serial port, such as a USB port, and wired controllers for console-based gaming systems might use a proprietary interface. Wireless controllers are designed using such technologies as infrared, RF, or Bluetooth.

SUMMARY

A game controller operates in both a wired mode and a wireless mode, and is able to switch between these two modes without permanent disruption to an ongoing game. During a transition from one mode to another, a host gaming system detects when the controller is physically disconnected (for wired mode to wireless mode) or connected (for wireless mode to wired mode). Upon detection, the host gaming system stores the game data and user information and establishes a new communication link with the controller. The host gaming system subsequently reassociates the game data and user information with the game controller as it begins operating in the new mode. This allows the player to continue game play without interruption.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure describes a game controller that can be operated in both a wired mode and a wireless mode. The game controller can switch easily between the two modes without disrupting continued play of the game. For discussion purposes, the game controller is described in the context of a multi-purpose game controller for a console-based gaming system. However, the game controller may be configured in many different ways and with a wide variety of functionality, including specialty controllers.

Gaming System

Figure 1:
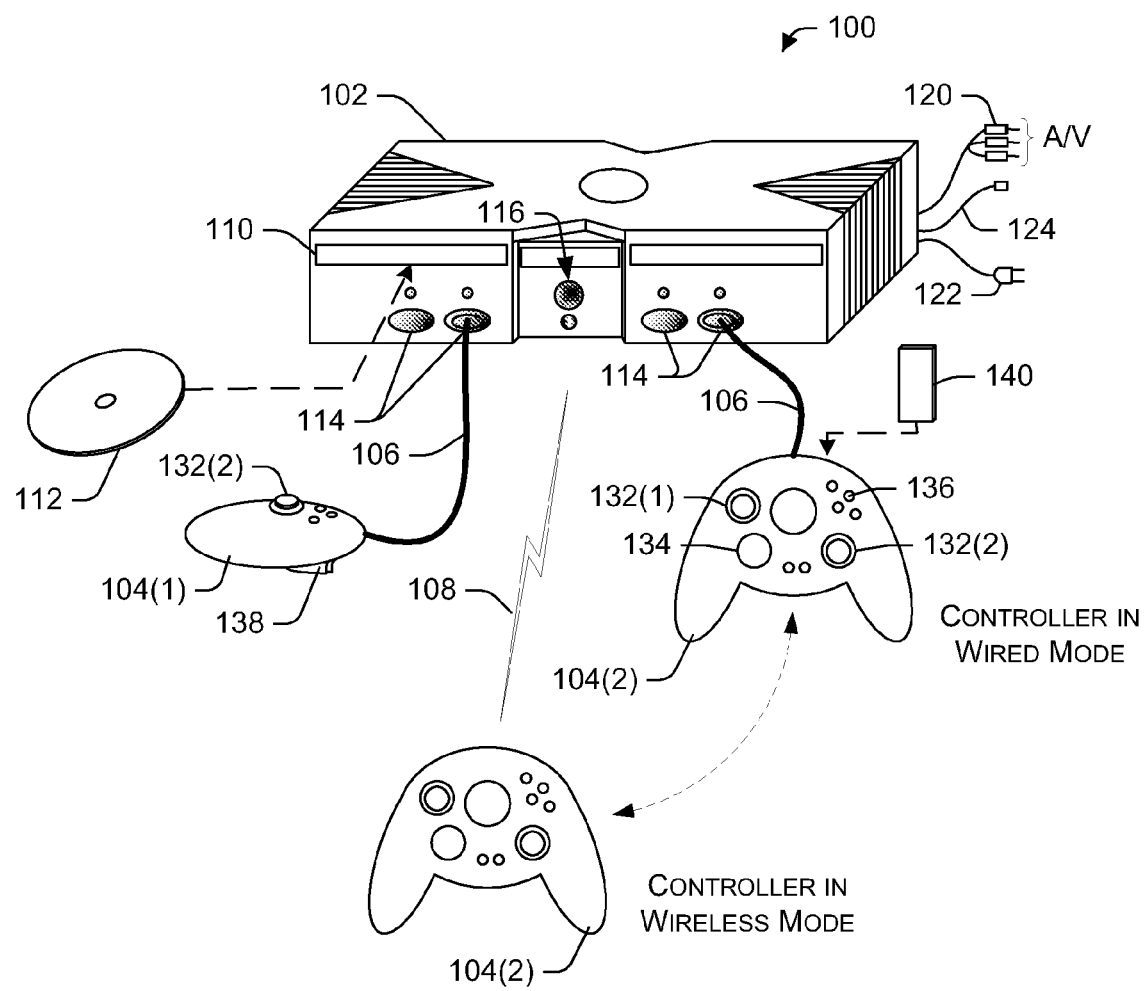
FIG. 1 illustrates a gaming system with a game console and a controller that can operate in both wireless and wired modes.

FIG. 1 shows an exemplary console-based gaming system 100. It includes a game console 102 and up to four controllers, as represented by two controllers 104(1) and 104(2). Each controller 104 is coupled to the game console 102 via a wire or wireless interface and utilizes a suitable data protocol, such as USB (Universal Serial Bus). One controller 104(2) is illustrated as operating in two different modes: a wired mode and a wireless mode. In the wired mode, the controller 104(2) is connected to the game console 102 via a cable 106. The controller derives power from the game console through the cable 106. In the wireless mode, the controller 104(2) is connected to the game console 102 via a wireless link 108. The wireless link may be implemented using any one of many different technologies including, for example, infrared, Bluetooth, or RF technologies. In the wireless mode, the controller 104(2) draws from its own power source, such as a battery. The cable 106 may optionally be detached from the controller to offer more freedom of movement.

The player can switch between wireless operation and wired operation by connecting the serial cable 106 to, or disconnecting it from, the game console 102. Mode-switching may occur during game play without interrupting the game. For example, if a game controller is in wireless mode and the battery runs low during game play, the player may switch to wired mode by plugging the cable 106 into the game console 102 and game play continues without interruption. While in wired mode, the game controller is powered by the game console and the controller battery is recharged.

The game console 102 is equipped with a portable media drive 110 and an optional internal hard disk drive. The portable media drive supports various forms of portable storage media as represented by an optical storage disc 112. Examples of suitable portable storage media include DVD, CD-ROM, game discs, game cartridges, and so forth.

The game console 102 has four slots 114 on its front face to support up to four controllers, although the number and arrangement of slots may be modified. In the wired mode, the game controllers 104 are assigned to the physical slots 114 for controlling various characters/features of the video game. In wireless mode, however, the game controllers 104(1)-104(4) are assigned to virtual slots.

In one implementation, virtual slots are assigned, without prompting the user, in sequential order to reduce complexity for the user. Thus, the first virtual slot is assigned to the first wireless game controller introduced to the host game console 102; the second virtual slot is assigned to the second wireless game controller, and so on. Alternatively, the user can choose a virtual slot via a user interface presented on the display. Actuation of a pre-designated button on the console invokes a slot assignment pane from which the player can select an available virtual slot.

Control buttons 116 are positioned on the front face of the game console 102. Control buttons 116 include, for example, a power button that switches power to the game console and an eject button that alternately opens and closes a tray of the portable media drive 110 to allow insertion and extraction of the storage disc 112.

The game console 102 connects to a television or other display (not shown) via A/V interfacing cables 120. A power cable 122 provides power to the game console. The game console 102 may be further equipped with internal or externally added network capabilities, as represented by the cable or modem connector 124 to facilitate access to a network, such as a local area network (LAN) or the Internet.

Each controller 104 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming mechanisms (e.g., shoulder buttons) may be substituted for or added to those shown in FIG. 1.

A memory unit (MU) 140 may be inserted into the controller 104 to provide additional and portable storage (as illustrated) or alternatively into the game console 102. Portable memory units enable users to store game parameters and transport them for play on other consoles. In the illustrated implementation, each controller is configured to accommodate two memory units 140, although more or less than two units may be employed in other implementations. In other implementations, the game console may support one or more memory units per player.

Figure 2:
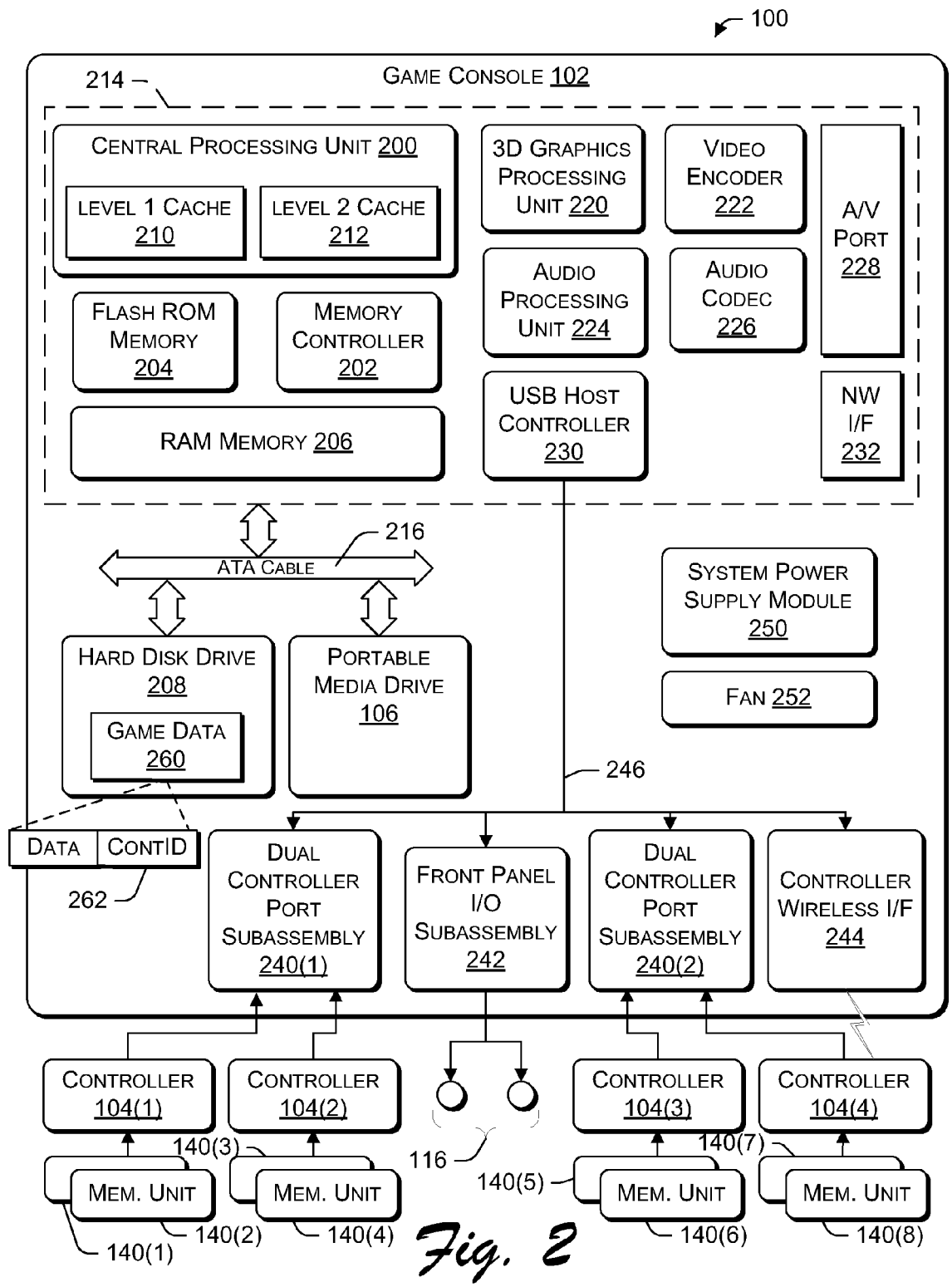
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting up to two of the game controllers 104(1)-104(4). A front panel I/O subassembly 242 supports the functionality of the control buttons 116, as well as any LEDs (light emitting diodes) or other indicators exposed on the outer surface of the game console. A controller wireless interface 244 is also provided to support wireless communication with the game controllers. The wireless interface 244 may use any one of many technologies, including IR, Bluetooth, and RF technologies. The subassemblies 240(1), 240(2), and 242 and controller wireless interface 244 are coupled to the module 214, and particularly the USB controller 230, via one or more cable assemblies 246.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202. It is noted that, in other implementations, the memory units 140 may be inserted into compatible slots in the game console 102.

A system power supply module 250 provides power to the components of the gaming system 100 and to the game controllers 104 when operating in the wired mode. A fan 252 cools the circuitry within the game console 102.

The game console 102 may further implement a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

Game data 260 generated during game play is stored in memory at the game console, such as in hard disk drive 208 (although other storage may be used). The type and quantity of game data is game specific and can be essentially anything that a game developer would like to track. Examples of game data might include skid marks or fuel level in a racing game, weapon selection or life count in shooter games, and so forth.

The game data 260 is stored in relation to a controller ID 262. When a player switches between wired and wireless mode of operation, the controller passes in the controller ID and the console tries to match it with any controller IDs stored on hard disk drive 208 in relation to saved game data 260. If a match is found, the game console reassociates the corresponding game data with the controller.

Figure 3:
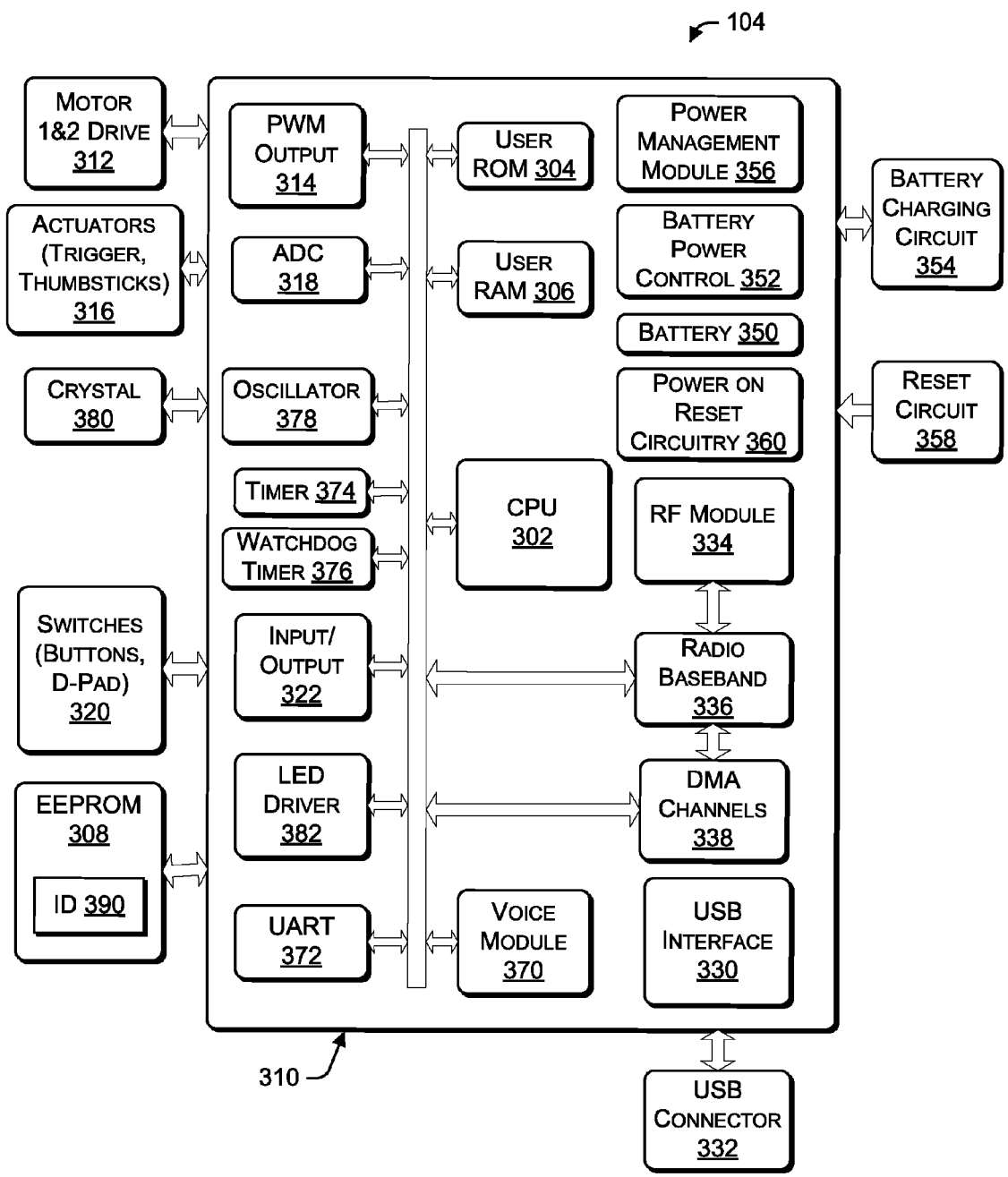
FIG. 3 is a block diagram of the controller.

FIG. 3 shows functional components of the game controller 104 in more detail. The controller 104 has a central processing unit (CPU) 302 and memory, including ROM 304, RAM 306 and EEPROM 308. In the illustrated implementation, the CPU 302, ROM 304, and RAM 306 are integrated onto a common module 310 and are interconnected via one or more bussing structures. EEPROM 308 is separate from, but interfaced with, the module 310.

The game controller 104 further includes motor drives 312 to provide tactile feedback to the player and a PWM (pulse width modulation) output 314 to provide the control signals for the motor drives. Player actions received via variable-input actuators 316 (e.g., thumbsticks 132 and triggers 138) are converted by analog-to-digital converter (ADC) 318 to provide player input to the CPU 302. ADC 318 can be implemented, for example, as an eight channel 10-bit or 12-bit converter. Other player actions received through dual-state switches 320 (e.g., buttons 136 and D-pad 134) are passed through I/O 322 to CPU 302.

As noted above, the game controller 104 supports both wired operation and wireless operation. The game controller 104 includes a USB interface 330 and USB connector 332 for the wired mode of operation. In the illustrated implementation, the game controller 104 is configured to support wireless operation using RF (radio frequency) technologies. An RF module 334 (e.g., 2.4 GHz RF module), a radio baseband unit 336, and DMA (Direct Memory Access) channels unit 338 support the wireless mode of operation. In other implementations, the game controller can be designed to utilize alternative wireless technologies, such as IR (infrared), Bluetooth, UWB (UltraWide Band), and so forth.

The game controller 104 is equipped with its own power source to enable wireless operation. In the illustrated implementation, a battery 350 supplies power to the electronic modules and components of the game controller 104. A battery power controller 352 monitors the battery 350 and detects when power is low. Upon detection, a low power condition can be conveyed to the player (e.g., illumination of a light indicator on the controller or display of a warning while the game is being played). The player can then switch to wired mode by plugging in the cable to the game console. The battery power controller 352 also monitors charging behavior of the battery, such as how long it takes to charge and detection of when it is fully charged. In wired mode, the game controller 104 receives power from the game console. A battery charging circuit 354 recharges battery 350 while the controller is connected via the cable. A reset circuit 358 and power on reset circuitry 360 allow the game controller to be reset during operation or when power is initially provided. A power management module 356 generates voltages for the different components on the module 310 and dynamically manages power consumption of those components.

As part of the power management, the console maintains battery life data including, for example, the total life expectancy of the battery, how much power has been drawn during wireless play, and the amount of time left before the battery supply is effectively depleted. The controller sends the battery life data to the console and the console can utilize the data to instruct the player when to switch from wireless play to wired play so that the controller can be recharged. For instance, the console may flash a warning light on the console or present a pop up message on the display to inform the player of low battery conditions and suggest that the player plug the controller cable into the console for continued play.

A voice module 370 may be optionally included in the game controller 104 to receive oral commands or speech from the player. The game controller 104 also has timing components to provide timing functionality, including a general purpose timer 374 (e.g., 16-bit timer), a watchdog timer 376, an oscillator 378, and a crystal 380.

One or more identifiers 390 are stored in EEPROM 308. In particular, the EEPROM 308 stores a session ID that is used to facilitate switching between wired mode and wireless mode without causing permanent disruption to game play. The session ID includes an active game ID that identifies the current virtual slot being used by the controller and a device ID that identifies the controller itself. After a mode transition occurs (i.e., from wired mode to wireless mode, or vice versa) and a new connection is established, the game controller 104 passes the session ID to the game console. The game console extracts the controller ID portion and looks to match it with any controller ID stored on the game console in relation to saved game data. If a match is found, the game console reassociates the corresponding game data with the controller. In this manner, game play can continue uninterrupted during transition from wireless mode to wired mode.

Mode Switching Operation

Figure 4:
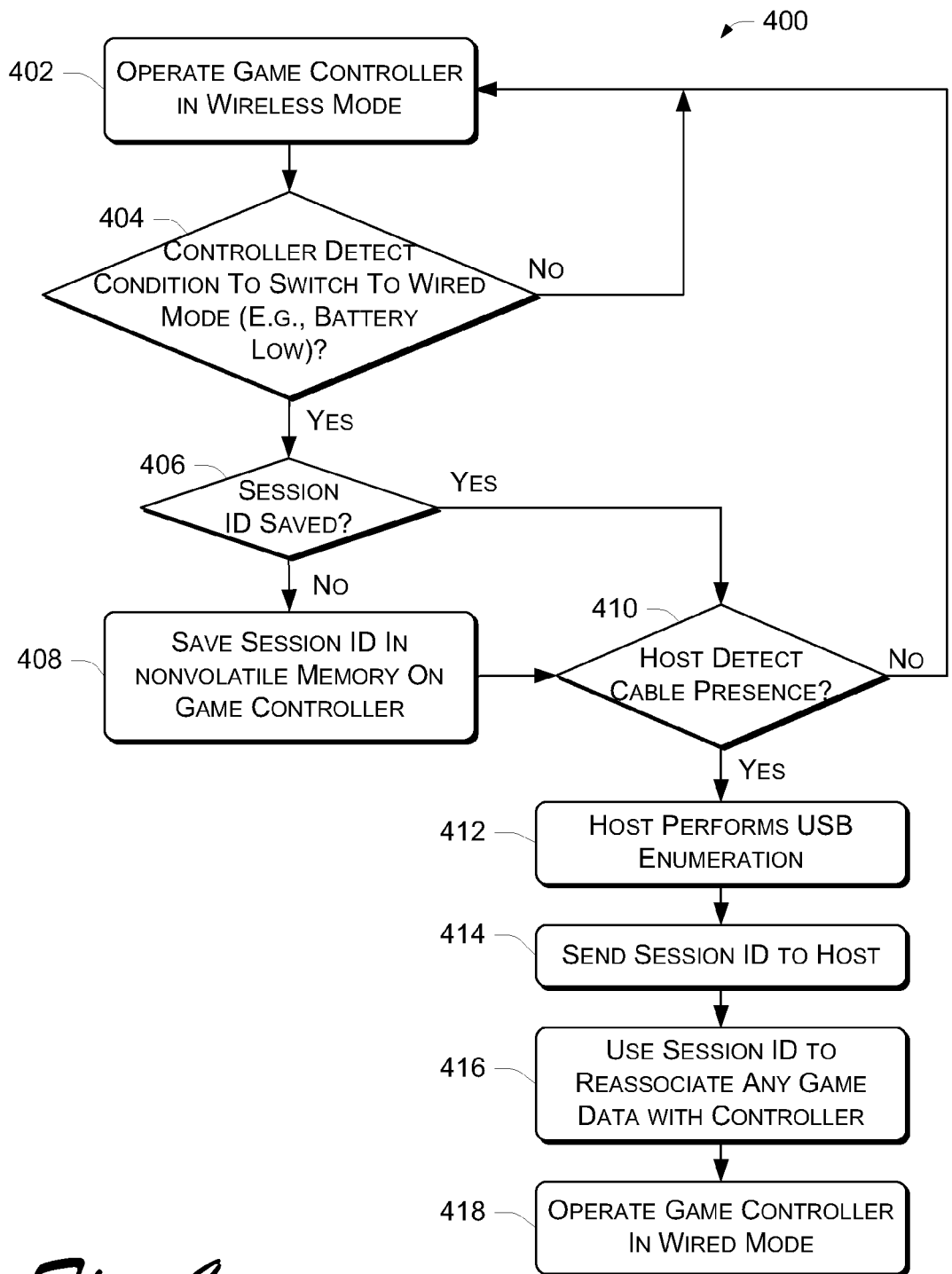
FIG. 4 is a flow diagram showing a process for converting use of the controller from wireless operation to wired operation.

FIG. 4 shows a process 400 for switching a game controller from a wireless mode of operation to a wired mode of operation. The process 400 is illustrated as a collection of blocks in a logical flow graph, which represent a sequence of operations that can be implemented in hardware, software, or a combination thereof. In the context of software, the blocks represent computer instructions that, when executed by one or more processors, perform the recited operations.

The process includes operations performed by both the game controller and a host gaming system. For discussion purposes, the process 400 is described with reference to the controller 104 and game console 102 described above with respect to FIGS. 1-3. It is noted that the process 400 may be implemented by other types of controllers that are designed for both wired and wireless communication, and for other types of gaming systems, such as PCs.

At block 402, the game controller 104 is operated in a wireless mode. In this mode, the game controller 104 draws power from the battery 350 and transmits user commands via the RF module 334 to the game console 104. During operation in wireless mode, the game controller 104 monitors for conditions that might suggest a switch in operation from wireless mode to wired mode (block 404). One example of a condition is where battery power controller 352 detects that battery 350 is running low. Another example condition occurs when a number of packets are lost or otherwise contain incorrect data during the wireless exchange between the controller 104 and console 102, perhaps due to a noisy RF environment or other interference. If no such conditions arise (i.e., the "No" branch from block 404), the game controller remains in wireless mode.

When a transition condition is detected (i.e., the "Yes" branch from block 404), the game controller 104 determines whether the session ID is saved in memory resident at the controller (block 406). The session ID includes an active game ID that identifies the current virtual slot being used by the controller and a device ID that identifies the controller. If the session ID is not saved (i.e., the "No" branch from block 406), the game controller 104 saves the session ID in non-volatile memory resident at the controller, such as EEPROM 308 (block 408).

Once the session ID is saved on the controller, the host (e.g., game console 102) determines whether the cable 106 is connected to one of the physical slots 114 (block 410). If not (i.e., the "No" branch from block 410), the game controller 104 continues to be operated in wireless mode. It may continue in this mode until the cable is attached or the battery ceases to supply sufficient power. When the cable is connected (i.e., the "Yes" branch from block 410), the game console 102 performs USB enumeration to establish a USB connection via the cable 106 (block 412).

Once the connection is established, the game controller 104 retrieves the session ID from nonvolatile memory and sends it to the game console (block 414). The game console uses the session ID to locate any saved game data and reassociates that game data with the controller (block 416). More particularly, as game data 260 is generated during play, it is stored at the game console 102 in relation to a controller ID 262 associated with the game controller. The controller ID may be unique to the controller itself or it may represent a connection slot currently being used by the controller. When a mode transition occurs (i.e., from wired mode to wireless mode, or vice versa), the game console uses the controller ID from the session ID received from the newly attached game controller and looks to match it with any controller ID stored on the game console. If a match is found, the game console reassociates the game data for the active game identified in the session ID with the controller. In this manner, game play can continue uninterrupted during transition from wireless mode to wired mode. At block 418, the game controller 104 continues in wired mode.

Figure 5:
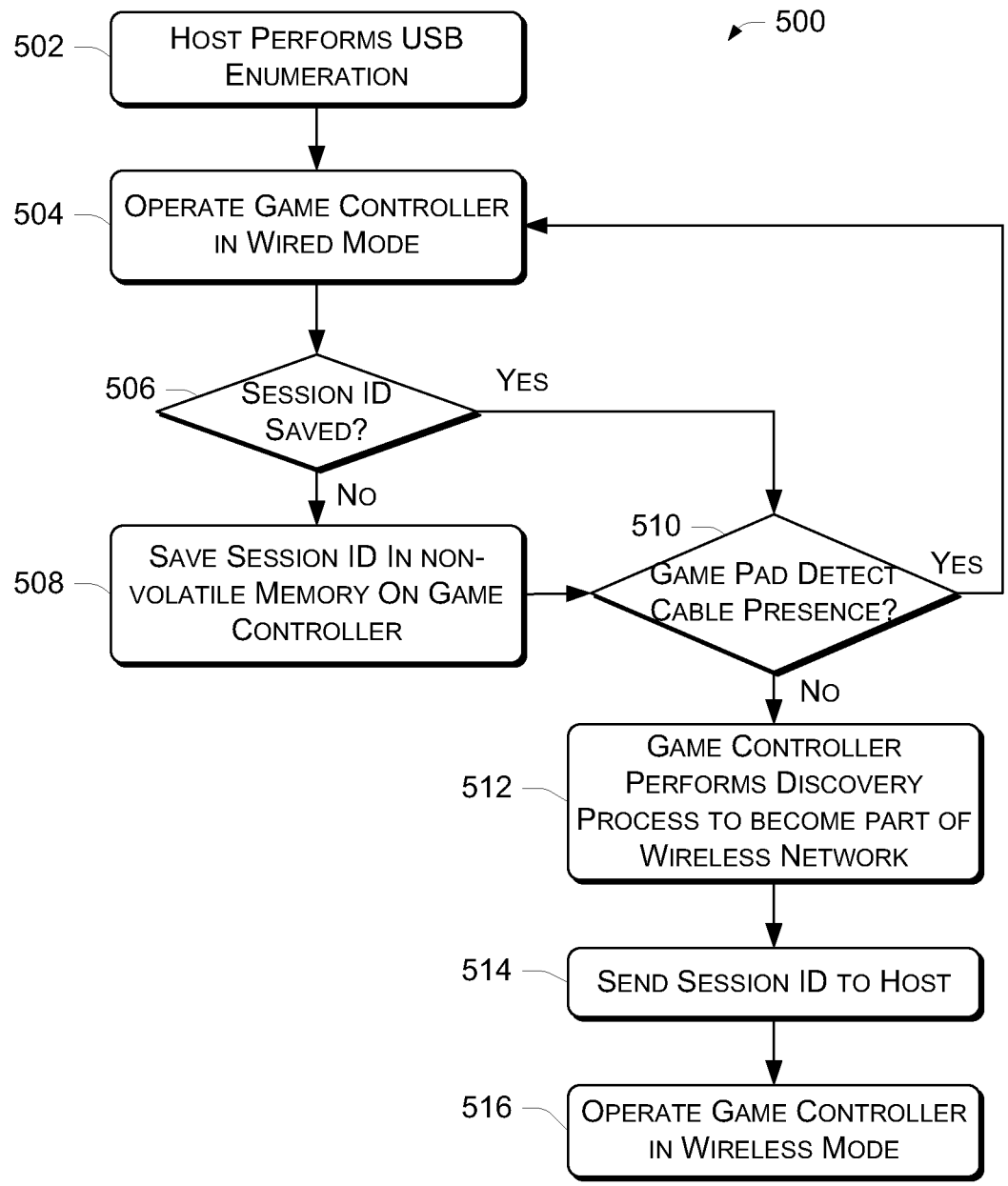
FIG. 5 is a flow diagram showing a process for converting use of the controller from wired operation to wireless operation.

FIG. 5 shows a process 500 for switching a game controller from a wired mode of operation to a wireless mode of operation. The process includes operations performed by both the game controller and a host gaming system, and once again will be described with reference to the controller 104 and game console 102 described above with respect to FIGS. 1-3.

At block 502, the host (e.g., game console 102) performs USB enumeration to establish a USB connection with the game controller 104 via the cable 106. Once a connection is established, the game controller 104 is operated in the wired mode (block 504). At block 506, the game controller 104 determines whether the session ID is saved in controller memory. If the session ID is not saved (i.e., the "No" branch from block 506), the game controller 104 saves the session ID in nonvolatile memory, such as EEPROM 308 (block 508).

Once the session ID is saved on the controller, the game controller 104 determines whether the cable 106 remains connected to one of the physical slots 114 of the game console (block 510). If it is still connected (i.e., the "Yes" branch from block 510), the game controller 104 continues to be operated in wired mode. When the cable is disconnected (i.e., the "No" branch from block 510), the game controller 104 performs a discovery process to become part of a wireless network and establish a wireless connection between the game controller and the game console (block 512).

Once a wireless connection is established, the game controller 104 retrieves the session ID from its nonvolatile memory and sends it to the game console so that any on-going game data can be reassociated with the controller (block 514). At block 516, the game controller 104 continues to operate in wireless mode.

The described mode switching processes 400 and 500 also accommodate the situation where a new player joins a game. A new player can connect his/her game controller to an available physical slot for wired operation or begin operation directly in wireless mode using the discovery process. The game console first attempts to match the session ID with a current list of session IDs. When a match is not found, the game console associate that device ID with the physical or virtual slot through which it communicates. It can then begin storing game data in relation to that device ID.

Conclusion

The above-described game controller facilitates both wired and wireless operation and the ability to switch between wired and wireless operation without interrupting an ongoing game. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a game controller comprising:
   the game controller communicating with a host gaming system in a wireless mode of operation;
   monitoring, at the game controller, power supply data associated with a game controller power supply;
   detecting, based at least in part on the monitoring, a condition that suggests switching from the wireless mode of operation to a wired mode of operation during gameplay;
   communicating, based on the condition, an indication to the host gaming system thereby causing the host gaming system to display a notification to switch from the wireless mode of operation to the wired mode of operation;
   transitioning from the wireless mode of operation to the wired mode of operation; and
   in response to transitioning from the wireless mode of operation to the wired mode of operation, sending a session identification to the host gaming system thereby causing the host gaming system to re-associate the game controller with saved game data, the saved game data being generated during the gameplay before the transitioning from the wireless mode of operation to the wired mode of operation.

2. The method as recited in claim 1, wherein detecting the condition includes determining that the game controller power supply is low.

3. The method as recited in claim 1, further comprising:
   determining a loss of packets transmitted during the gameplay in the wireless mode of operation; and
   communicating the indication based on the condition and the determining the loss of packets.

4. The method as recited in claim 1, further comprising:
   determining that packets transmitted during the gameplay in the wireless mode of operation contain incorrect data; and
   communicating the indication based on the condition and the determining that the packets transmitted during the gameplay in the wireless mode of operation contain the incorrect data.

5. The method as recited in claim 1, wherein the power supply data includes a total life expectancy of the game controller power supply.

6. The method as recited in claim 1, wherein the power supply data includes an amount of power used by the game controller during the wireless mode of operation and an amount of time left before the game controller power supply is depleted.

7. The method as recited in claim 1, wherein the notification is a pop up message on a display coupled to the host gaming system and the pop up message includes information regarding a low game controller power supply condition.

8. The method as recited in claim 1, wherein the session identification comprises a game controller identifier used by the host gaming system to re-associate the game controller, currently operating in the wired mode of operation, with the saved game data.

9. The method as recited in claim 1, wherein the re-associating distinguishes the saved game data from other game data generated in association with another game controller during the gameplay.

10. One or more memory devices storing instructions that, when executed by one or more processors of a device, perform operations comprising:
   communicating with a host gaming system in a wireless mode of operation;
   monitoring power supply data associated with a power supply of the device;
   detecting, based on the monitoring, a condition that suggests switching the device from the wireless mode of operation to a wired mode of operation during gameplay;
   conveying an indication to switch to the wired mode of operation;
   transitioning from the wireless mode of operation to the wired mode of operation; and
   in response to transitioning from the wireless mode of operation to the wired mode of operation, sending a session identification to the host gaming system thereby causing the host gaming system to re-associate the device with saved game data, the saved game data being generated during the gameplay before the transitioning from the wireless mode of operation to the wired mode of operation.

11. The one or more memory devices as recited in claim 10, wherein detecting the condition includes determining that the power supply is low.

12. The one or more memory devices as recited in claim 10, wherein the operations further comprise determining a loss of packets transmitted during the wireless mode of operation, and wherein the condition is based in part on the loss of packets.

13. The one or more memory devices as recited in claim 10, wherein the operations further comprise determining that packets transmitted during the wireless mode of operation contain incorrect data, and wherein the condition is based in part on the determining that the packets transmitted during the wireless mode of operation contain the incorrect data.

14. The one or more memory devices as recited in claim 10, wherein the power supply data includes a total life expectancy of the power supply.

15. The one or more memory devices as recited in claim 10, wherein the power supply data includes an amount of power used by the device during the wireless mode of operation and an estimated amount of time left before the power supply will be depleted.

16. The one or more memory devices as recited in claim 10, wherein the device is a game controller.

17. The one or more memory devices as recited in claim 10, wherein the indication causes the host gaming system to display a message that instructs a user of the device to switch from the wireless mode of operation to the wired mode of operation.

18. The one or more memory devices as recited in claim 10, wherein the indication causes the host gaming system to display a notification that includes information regarding a low power supply condition.

19. The one or more memory devices as recited in claim 10, wherein the session identification comprises a device identifier used by the host gaming system to re-associate the device, currently operating in the wired mode of operation, with the saved game data.

20. A method implemented by a game controller comprising:
   the game controller communicating with a host gaming system in a wireless mode of operation;
   monitoring, at the game controller and during gameplay, power supply data associated with a power supply;
   detecting, based at least in part on the monitoring, a condition to switch from the wireless mode of operation to a wired mode of operation;
   in response to detecting the condition, transitioning from the wireless mode of operation to the wired mode of operation; and
   in response to transitioning from the wireless mode of operation to the wired mode of operation, sending a session identification to the host gaming system thereby causing the host gaming system to re-associate the game controller with saved game data, the saved game data being generated during the gameplay before the transitioning from the wireless mode of operation to the wired mode of operation.

* * * * *